(12) United States Patent
Dunbar et al.

(10) Patent No.: US 6,292,763 B1
(45) Date of Patent: Sep. 18, 2001

(54) METHODS FOR DESIGNING VARIABLE CYCLE GAS TURBINE ENGINES

(75) Inventors: Donald K. Dunbar, Sharonville; Marlen L. Miller, Mainville; George L. Converse, Cincinnati, all of OH (US)

(73) Assignee: Diversitech, Inc., Cincinnati, OH (US)

( * ) Notice: Subject to any disclaimer, the term of this patent is extended or adjusted under 35 U.S.C. 154(b) by 0 days.

(21) Appl. No.: 09/133,293

(22) Filed: Aug. 12, 1998

Related U.S. Application Data

(62) Division of application No. 08/703,851, filed on Aug. 27, 1996.

(51) Int. Cl.[7] .................................................. G06G 7/48
(52) U.S. Cl. ........................................ 703/7; 703/1; 703/8
(58) Field of Search ...................... 703/1, 7, 8; 60/226.1, 60/226.2, 226.3, 39.03

(56) References Cited

U.S. PATENT DOCUMENTS

| | | |
|---|---|---|
| 3,549,272 | 12/1970 | Bauger et al. . |
| 3,937,013 | 2/1976 | Aspinwall . |
| 4,080,785 | 3/1978 | Koff et al. . |
| 4,288,983 | 9/1981 | O'Rourke, Jr. . |
| 4,376,375 | 3/1983 | Boudignes . |
| 4,461,145 | 7/1984 | Stephens . |
| 4,791,783 | 12/1988 | Neitzel . |
| 5,042,245 * | 8/1991 | Zickwolf, Jr. ..................... 60/39.03 |
| 5,169,288 | 12/1992 | Gliebe et al. . |
| 5,184,459 | 2/1993 | McAndrews . |
| 5,259,187 | 11/1993 | Dunbar et al. . |
| 5,261,227 | 11/1993 | Giffin, III . |
| 5,281,087 | 1/1994 | Hines . |
| 5,311,736 | 5/1994 | Lardellier . |
| 5,586,053 * | 12/1996 | Park ........................................ 703/1 |
| 5,706,649 * | 1/1998 | Robinson et al. ................... 60/226.2 |
| 5,794,432 * | 8/1998 | Dunbar et al. ...................... 60/226.1 |
| 5,911,679 * | 6/1999 | Farrell et al. ...................... 60/39.183 |

OTHER PUBLICATIONS

Louay Aleid, et al., Variable Cycle Powerplants for a Mach 2.7 Supersonic Civil Transport, 1996, The American Society of Mechanical Engineers, New York, NY.

K. R. Bilwakesh, Evaluation of Range and Distortion Tolerance for High Mach Number Transonic Fan Satges, Jan. 1971, pp. 1, 17–25, vol. I, cover page and pp. iii, v and vi, General Electric Company, Cincinnati, OH.

G. T. Csanady, Theory of Turbomachines, McGraw–Hill, New York; 1964, page 11.

(List continued on next page.)

Primary Examiner—Kevin J. Teska
Assistant Examiner—Douglas W. Sergent
(74) Attorney, Agent, or Firm—Dinsmore & Shohl LLP

(57) ABSTRACT

A method for designing a variable cycle gas turbine engine having a fan assembly with a maximum air flow there through and a maximum pressure ratio there across during operation at a fan speed and a plurality of variable pitch vanes, which method includes the steps of selecting a first operating point of the variable cycle gas turbine engine at a fan speed having about maximum air flow through the fan assembly at a pressure ratio substantially less than maximum pressure ratio and selecting a second operating point of the variable cycle gas turbine engine at about the fan speed, wherein the second operating point has about the maximum pressure ratio across the fan assembly at an air flow through the fan assembly substantially less than the maximum air flow. A reference point having a reference air flow through the fan assembly and a reference pressure ratio across the fan assembly is selected. The geometry of the variable pitch vanes is determined so that the variable pitch vanes can operate at the reference point without stalling.

18 Claims, 8 Drawing Sheets

OTHER PUBLICATIONS

Perales et al., "Fuzzy Logic Control of a Varible Speed, Variable Pitch Wind Turbine", Proc. 25th Annual Conf. of the IEEE Industrial Electronics Society, 1999., vol. 2, pp. 614–618, Dec. 1999.*

Thiringer et al. "Control by Varible Rotor Speed of a Fixed–Pitch Wind Turbine Operating in a Wide Screen Range", IEEE Transactions on Energy Conversion, vol. 8, Issue 3, pp. 520–526, Sep. 1993.*

Dimeo et al., "Genetics–based Control of a MIMO Boiler–Trubine Plant", Proceedings of the 33rd Conf. on Decision and Control, vol. 4, pp. 3512–3517, Dec. 1994.*

Leithead et al., "Design of a Controller for a Test–Rig for a Variable Speed Trubine", Proc. of the Third IEEE Conference on Control Applications, vol. 1, pp. 239–244, Aug. 1994.*

Bhat et al., "Studies on the Determination of Natural Frequencies of Industrial Turbine Blades", Journal of Sound and Vibration, vol. 196, Issue 5, pp. 681–103, Feb. 1996).*

* cited by examiner

METHODS FOR DESIGNING VARIABLE CYCLE GAS TURBINE ENGINES

This application is a divisional of copending application Ser. No. 08/703,851 filed Aug. 27, 1996 which is incorporated herein by reference.

FIELD OF THE INVENTION

This invention relates generally to the field of gas turbine engines and compression assemblies therefor, and more particularly to methods for designing variable cycle aircraft engines having variable fan geometry.

BACKGROUND OF THE INVENTION

Gas turbine engines suitable for use in aircraft type applications can presently be placed into one of three broad categories, namely turbojet, turbofan and variable cycle engines. Turbojet engines typically comprise a rotatable compressor having a plurality of compressor blades, a combustor, and a rotatable high pressure turbine which is connected to the compressor by a shaft. In operation, the rotating compressor blades raise the temperature and pressure of air entering the turbojet engine. Fuel is mixed and burned with the air in the combustor. Some of the energy of the rapidly expanding gases exiting the combustor is converted by the turbine into rotation of the shaft which, in turn, rotates the compressor. The gases exit the turbojet engine through a nozzle such that the gases provide a force, or thrust, to the engine.

The net thrust, $F_n$, of an engine is a function, in part, of the air flow, W, through the engine and the change in velocity of the air between the engine inlet and the engine exhaust, as shown by simplified equation (1) below.

$$F_n = W^*(Vj-Vo) \tag{1}$$

Where:
W=total air mass flow rate
Vj=exhaust gas velocity
Vo=aircraft flight velocity (i.e., gas inlet velocity)

Thus, an increase in either exhaust gas velocity Vj and/or the air flow W through the engine increases net engine thrust $F_n$. For a specific flight condition, the exhaust gas velocity Vj is proportional to the engine pressure ratio (i.e., the ratio between the exhaust gas pressure and the inlet gas pressure) and the air inlet temperature to the turbine. Specific thrust, $F_{sp}$ is commonly understood in the art as a measure of the thrust of an engine relative to the engine size, with engine size generally being proportional to the air flow through the engine. As used herein, the phrase specific thrust $F_{sp}$ is intended to mean the net thrust $F_n$ produced by an engine per pound air, as shown by equation (2) below.

$$F_{sp} = F_n/W = Vj - Vo \tag{2}$$

Thus, equations (1) and (2) indicate that high specific thrust values $F_{sp}$ require high exhaust gas velocities Vj which, in turn, require a high overall engine cycle pressure ratio. However, high specific thrust $F_{sp}$ values also imply low propulsive efficiencies, $\eta_p$, wherein propulsive efficiency $\eta_p$ is a measure of how much engine output appears as useful work supplied to the aircraft. As shown by equation (3) below, propulsive efficiency $\eta_p$ reduces to a function of the air inlet velocity Vo and the air exhaust velocity Vj.

$$\eta_p = 2/(1+Vj/Vo)$$

As shown by equation (3), large exhaust gas velocities Vj provide low propulsive efficiencies $\eta_p$, yet generate high specific thrust $F_p$. Likewise, low exhaust gas velocities Vj produce high propulsive efficiencies $\eta_p$ but provide reduced specific thrust $F_{sp}$.

Relative to turbofan engines, Turbojet engines provide lower air flows W through the engine in combination with high engine exhaust gas velocities Vj which provide relatively high specific thrust values $F_{sp}$, as shown graphically in FIG. 1. The high specific thrust values $F_{sp}$ advantageously provide rapid aircraft acceleration. However, the high exhaust gas velocity Vj of turbojet engines can create excessive turbulent and shear noise at low aircraft flight speeds, such as during aircraft takeoff. In addition, turbojet engines burn relatively more fuel per pound of thrust generated because of the low propulsive efficiencies $\eta_p$ of these engines.

The second category of aircraft gas turbine engines are known as turbofan engines. Turbofan engines have, in addition to the above-described turbojet engine structure (known as the turbofan engine core), a fan assembly upstream of the compressor which is driven by a low pressure turbine disposed downstream of the high pressure turbine. A portion of the air passing through the fan assembly enters an outer air duct while the remaining air enters the engine compressor. The engine bypass ratio refers to the ratio of air flow through the outer duct divided by the air flow though the turbofan engine core.

High bypass ratio turbofan engines accelerate a very large mass of air to relatively low exhaust gas velocities Vj. This combination, as shown by equation (2) results in relatively low values of thrust $F_n$ and specific thrust $F_{sp}$, and relatively high propulsive efficiencies $\eta_p$ at low aircraft flight speeds. The high propulsive efficiencies $\eta_p$ reduce the amount of the fuel burned per pound of thrust. Further, the low exhaust gas velocity Vj reduces the turbulent and shear noise generated from interaction of the engine exhaust stream with the ambient air. As shown in FIG. 1, low bypass turbofan engines operate in between high bypass turbofan engines and turbojet engines. Examples of turbofan engines are discussed in U.S. Pat. Nos. 4,288,983 to O'Rourke, Jr.; 5,169,288 to Gliebe et al.; and 5,259,187 to Dunbar et al.

It is apparent to those skilled in the art that turbojet or low bypass turbofan engines having low air mass flow rates W and high exhaust gas velocities Vj are better suited for high aircraft speeds while high bypass turbofan engines become inefficient and are incapable of delivering sufficient specific thrust $F_{sp}$ at such high speeds. In contrast, high bypass turbofan engines are better suited for low aircraft speeds where adequate specific thrust $F_{sp}$ can be provided at a higher propulsive efficiency $\eta_p$ with reduced sideline and community jet noise because of the lower exhaust gas velocities Vj.

A third category of aircraft gas turbine engines are known as variable cycle engines. Variable cycle engines combine the operational characteristics of turbojet or low bypass turbofan engines with the operational characteristics of high bypass turbofan engines. For example, U.S. Pat. No. 4,080,785 to Koff et al. discloses a variable cycle turbofan engine having a core engine, first and second fans, and first and second fan bypass ducts. Both fans have variable pitch inlet guide vanes and variable pitch stator vanes. Koff et al. teach that by varying the pitch of the vanes in the first and second fans, the engine can operate in high bypass and low bypass modes, thereby providing a single engine which is efficient at both low and high aircraft flight speeds.

Koff et al. further teach that in operation, "high flow" running (i.e, open pitch) of the first fan coupled with "low flow" running (i.e, closed pitch) of the second fan results in a high bypass ratio, wherein a large quantity of air is drawn through the engine, of which only a small portion passes through the core and first fan duct. "Low flow" running of the first fan, coupled with the "high flow" running of the second fan, results in a low bypass ratio since the second fan can accept substantially all the air flow through the first fan. In addition, Koff et al. teach that maximum thrust can be delivered at an intermediate bypass ratio wherein both fan stages are set for maximum air flow therethrough. Koff et al. further state that the overall fan pressure ratio reaches a maximum at this operating point.

U.S. Pat. No. 5,311,736 to Lardellier discloses a variable cycle propulsion engine for supersonic aircraft which provides high specific thrust $F_{sp}$ at supersonic speeds with reduced exhaust gas velocity Vj at subsonic speeds for diminished noise emissions. Lardellier teaches a turbojet engine having rotatable fan blades disposed in an outer or bypass duct adjacent the compressor. The fan blades are connected to a drive shaft interconnecting the high pressure turbine and compressor. Variable pitch inlet and outlet guide vanes, also disposed within the outer duct, are located upstream and downstream of the fan blades, respectively. The variable pitch vanes can be provided with three pivotally connected parts such that the trailing edge of the inlet guide vanes is pivotable while the leading edge of the outlet guide vanes is similarly pivotable. The outer duct walls can also be provided with one or more inlets and discharge outlets which can provide additional air to the fan assembly depending upon the operational requirements of the engine.

At high aircraft flight speeds, Lardellier teaches that the trailing edge of the inlet guide vanes are pivoted in the same direction as the direction of rotation of the fan blades while the leading edge of the outlet guide vanes are pivoted in a direction opposite the direction of rotation of the fan blades. The outer duct inlets and discharge outlets are closed. In this configuration, the fan operates at a low rate of output. Alternatively, the outer duct can be closed by inflating bladders within the duct, thereby preventing air flow through the fan assembly. At low aircraft flight speeds (e.g., during aircraft takeoff and climb), the air inlets can be opened to supply additional air to the fan which operates at full output during take-off and climb. The inlet guide vanes are adjusted so that their leading edges and trailing edges are aligned along a line parallel to the rotational axis of the engine, and the flow straightener vanes are adjusted so that they adopt a configuration wherein the leading edge is slightly displaced from a line through the trailing edge parallel to the engine axis.

Although the above-described gas turbine engines may be suitable for the purposes for which they were intended, improved variable cycle gas turbine engines having additional benefits and features are desired. For example, a variable cycle engine which is capable of providing large swings in air flow and fan pressure ratio, more particularly, a variable cycle engine which is capable of providing maximum air flow at a low fan pressure ratio and a substantially higher fan pressure ratio at a substantially lower air flow rate would be desirable. A variable cycle engine capable of such operation advantageously provides low noise during take-off because of the low exhaust gas velocity Vj and rapid aircraft acceleration at altitude because of high specific thrust. Variable cycle engines having the above-described benefits and features in the absence of complex and weighty engine structures such as, multiple fan bypass ducts, air inlets, inflatable bladders, or noise suppression structures, would be particularly useful.

SUMMARY OF THE INVENTION

It is an object of this invention to provide a method for designing a variable cycle gas turbine engine which has a simplified construction while providing improved operational flexibility. It is a further object of the present invention to provide a variable cycle gas turbine engine which can provide maximum air flow at a low fan pressure ratio and a higher fan pressure ratio at a lower air flow rate.

In order to accomplish these objects, as well as further objects which will become apparent hereafter, the present invention provides a gas turbine engine having a compression assembly disposed upstream of a combustor. More preferably, the present invention includes a fan assembly having a plurality of variable pitch vanes; a core engine comprising a compressor, a combustor, and a first turbine assembly; a second turbine assembly, and an exhaust assembly. The core engine is located downstream of the fan assembly and further includes a first shaft which interconnects the first turbine assembly and the compressor such that the compressor is rotatably driven by the first turbine assembly.

The gas turbine engine has a fan assembly with a maximum air flow there through and a maximum pressure ratio there across during operation at a fan speed. The method includes the steps of selecting a first operating point of the variable cycle gas turbine engine at a fan speed having about said maximum air flow through the fan assembly at a pressure ratio substantially less than said maximum pressure ratio and selecting a second operating point of the variable cycle gas turbine engine at about the fan speed, wherein the second operating point has about the maximum pressure ratio across the fan assembly at an air flow through the fan assembly substantially less than the maximum air flow. A reference point having a reference air flow through the fan assembly and a reference pressure ratio across the fan assembly is selected. The geometry of the variable pitch vanes is determined so that the variable pitch vanes can operate at the reference point without stalling.

The present invention advantageously provides a gas turbine engine capable of supplying a high corrected air flow at a low pressure ratio for low jet noise during aircraft take-off and, conversely, low corrected air flow at a high pressure ratio for rapid aircraft climb and acceleration. In addition, these advantages can be achieved without resorting to the use of complex and weighty engine structures. The large swings in corrected air flow and pressure ratio accommodated by engine designs incorporating the present invention can also provide a gas turbine engine system and installation having reduced fuel consumption, thereby increasing aircraft flight ranges.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

DETAILED DESCRIPTION

Figure 1:
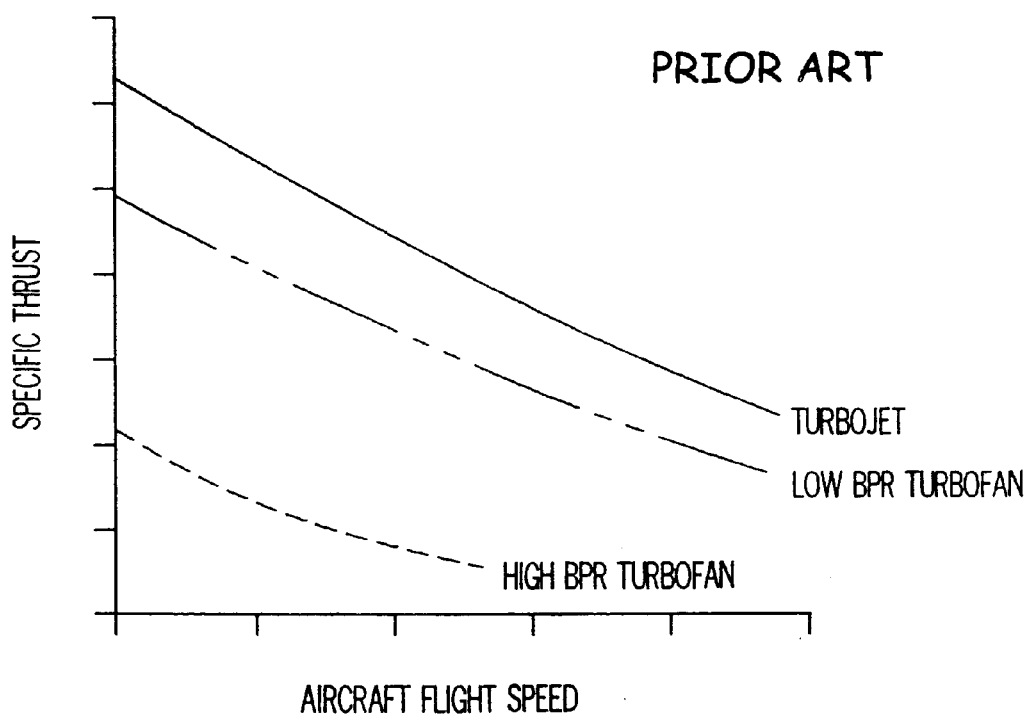
FIG. 1 is a graphical plot of the relationship between aircraft flight speed and engine specific thrust in conventional gas turbine engines.
Figure 2:
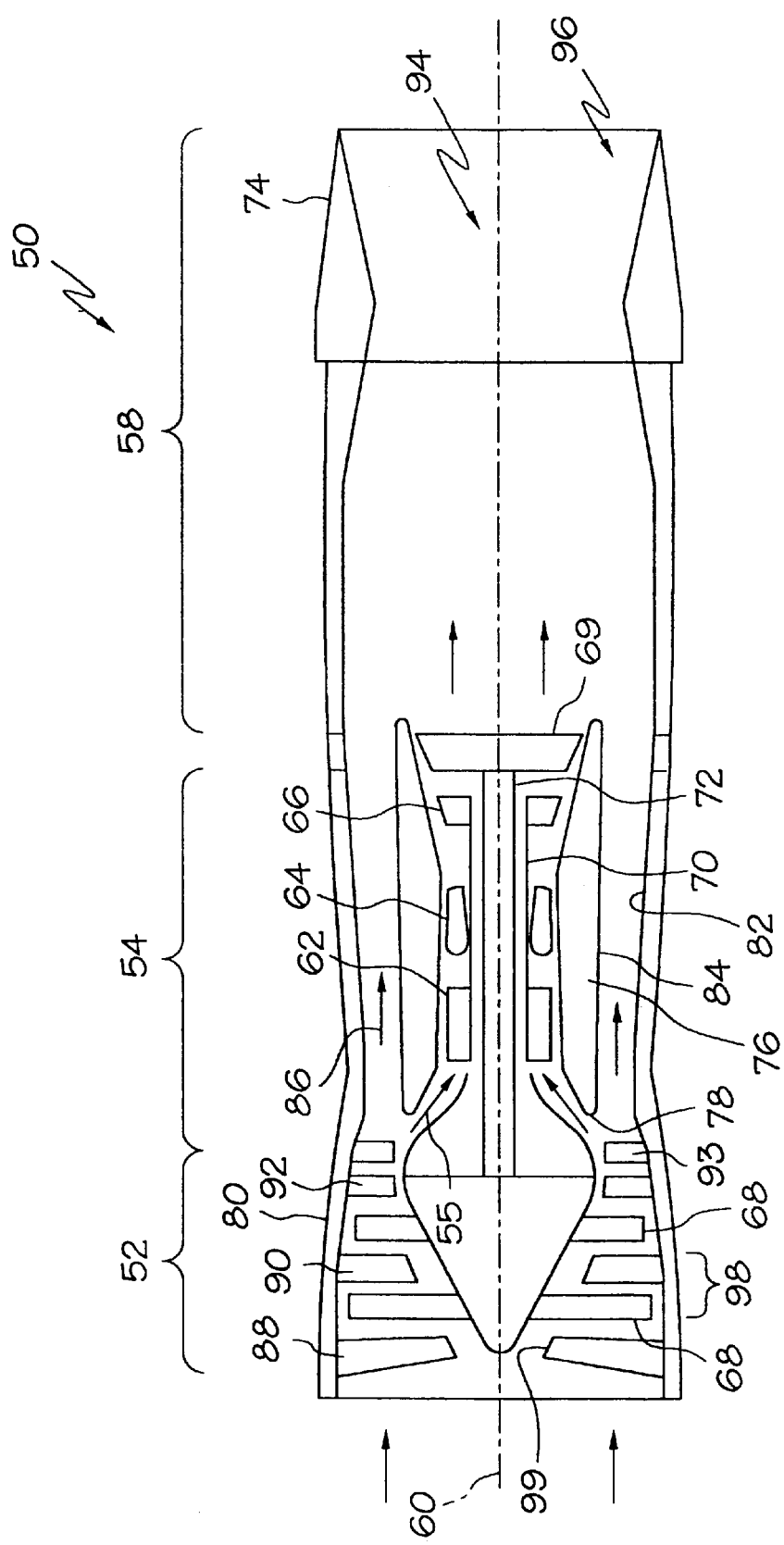
FIG. 2 is a cross-sectional side view of a gas turbine engine in accordance with one embodiment the present invention.

Reference will now be made in detail to the present preferred embodiments of the invention, examples of which are illustrated in the accompanying drawings wherein like numerals indicate the same elements throughout the views. As will be understood hereafter, the present invention preferably comprises a gas turbine engine having a fan assembly with variable pitch fan vanes which are capable of regulating the air flow through and the fan pressure ratio across the fan assembly such that substantial swings in both can be accommodated. Gas turbine engines of the present invention can be used for powering an aircraft from take-off through climb, cruise, approach, and landing. Alternatively, gas turbine engines of the present invention can also be used in marine or industrial applications (e.g., powering ships, electrical generators etc.). More specifically, FIG. 2 is an exemplary cross-sectional view of a gas turbine engine 50 made in accordance with present invention wherein unnumbered arrows indicate the direction of air flow through the engine 50. Engine 50 has a fan assembly 52 and a core engine 54 disposed downstream of the fan assembly 52, wherein the core engine 54 has an inner flow path 55 generally defined by a compressor 62, a combustor 64, a first or high pressure turbine assembly 66, and a core nacelle 76. Engine 50 also includes a second or low pressure turbine assembly 69 and an exhaust assembly 58 downstream of the core engine 54. An axis or centerline 60 of the engine 50 extends longitudinally from fan assembly 52 at the forward end of engine 50 to the exhaust assembly 58 at the aft end of engine 50. A first shaft 70 is disposed about and is coaxial with centerline 60 such that compressor 62 is rotatably interconnected with high pressure turbine assembly 66.

As seen in FIG. 2, the fan assembly 52 comprises a plurality of radially outwardly extending fan blades 68 which rotate about the centerline 60 and whose purpose is to impart kinetic energy to the air passing therethrough. This energy is then converted to a pressure rise across the fan assembly, wherein the ratio of the inlet pressure to the exit pressure of the fan assembly is known as the fan pressure ratio. A second shaft 72 is disposed coaxially about centerline 60 and first shaft 70 and rotatably interconnects the second or low pressure turbine assembly 69 and fan blades 68. While the present invention preferably comprises a fan assembly 52, it will be understood that the present invention is generally applicable to any turbo machinery in a gas turbine engine which is used to impart kinetic energy to air by means of rotating blades. Thus, the present invention can also be incorporated into other air compression assemblies (e.g., a booster, compressor or the like) in place of or in combination with the fan assembly 52.

Core engine 54 and low pressure turbine assembly 56 are surrounded by a casing or core nacelle 76 which supports shafts 70 and 72 by bearings (not shown). Core nacelle 76 is disposed longitudinally aft of fan assembly 52 and has a forward end defining a flow splitter 78. An engine nacelle 80 surrounds fan blades 68 and core nacelle 76 and includes an engine nacelle inner surface 82 and core nacelle outer surface 84 which define a fan bypass duct 86.

Figure 2A:
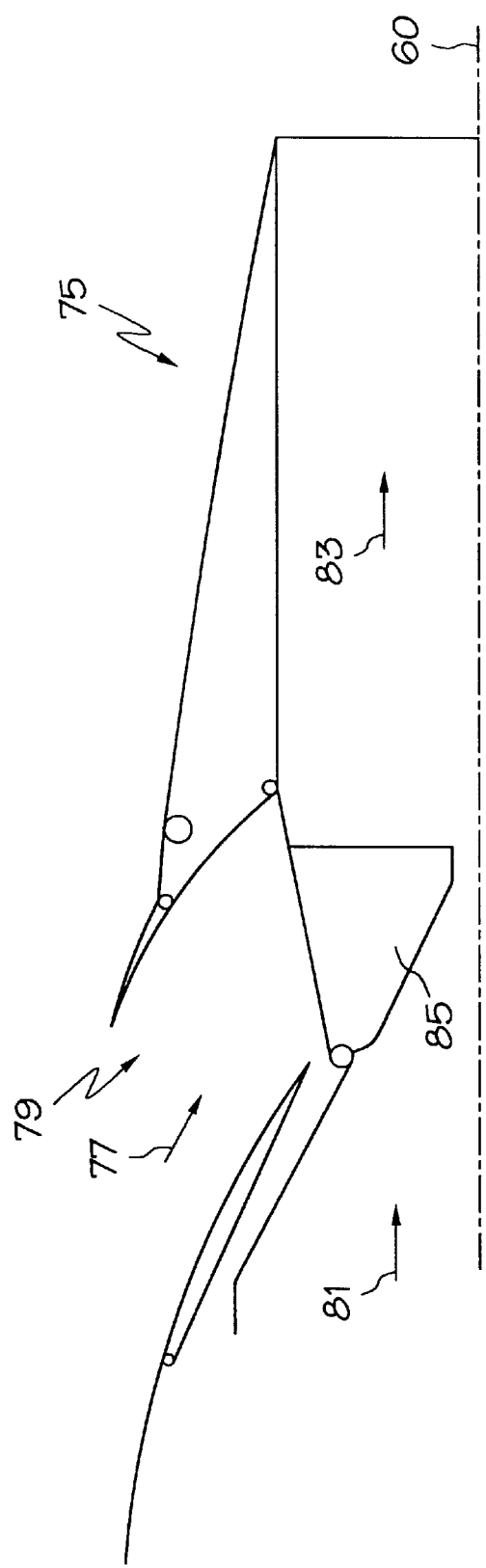
FIG. 2a is partial cross-sectional side view of a mixer/ejector exhaust nozzle suitable for use in the gas turbine engine of FIG. 2.

Air entering the fan assembly 52 undergoes a pressure rise across the fan assembly and is subsequently split between the fan bypass duct 86 and inner flow path 55 of core engine 54 by the flow splitter 78. The pressurized air entering the inner flow path 55 undergoes a further pressure rise across the compressor 62 after which it is mixed with fuel in the combustor and ignited. The rapidly expanding heated gases exit combustor 64 and enter high pressure turbine 66, wherein some of the energy of the combustion gases is extracted and used to rotate first shaft 70 and compressor 62 to which it is fixedly connected. The combustion gases, upon exiting high pressure turbine assembly 66, enter low pressure turbine assembly 69 at a reduced total pressure, total temperature and velocity relative to entering the high pressure turbine assembly. Low pressure turbine assembly 69 converts some of the energy of the combustion gases into rotational energy of second shaft 72 and fan blades 68 to which it is fixedly connected. The combustion gases exit low pressure turbine assembly 69 and enter exhaust assembly 58 at further reduced total pressure, total temperature, and velocity (relative to the values possessed upon) first entering the low pressure turbine. The combustion gases exit the exhaust assembly through a convergent/divergent exhaust nozzle 74 having a variable throat area 94 and exit area 96. The variable throat area 94 and exit area 96 can be adjusted so that a nearly ideal nozzle expansion ratio is obtained for a given engine operating condition, thereby substantially reducing or eliminating engine exhaust noise caused by air flow shock waves forming within or just outside of convergent/divergent exhaust nozzle 74. Alternatively, convergent/divergent exhaust nozzle 74 can be replaced with a mixer/ejector nozzle 75, wherein, for example during a takeoff aircraft flight condition, ambient air flow 77 enters mixer/ejector nozzle 75 though inlet 79 and subsequently entrained within engine air flow 81 such that mixed air flow 83 has a pressure, temperature, and velocity less than that of engine air flow 81 but greater than ambient air flow 77, as shown in FIG. 2a. The mixing of ambient air flow 77 with engine air flow 81 via mixer 85 further reduces the engine exhaust noise. During other operating conditions, mixer/ejector nozzle 75 functions similar to convergent/divergent nozzle 74.

In accordance with the present invention, the fan assembly 52 is provided with variable pitch fan geometry which preferably comprises a plurality of radially extending variable pitch inlet guide vanes 88 (VIGVs), a plurality of variable pitch stator vanes 90 (VSVs), and a plurality of variable pitch outlet guide vanes 92 (VOGVs). As described in more detail hereafter, the variable fan geometry of the present invention provides a variable cycle engine capable of providing substantial changes in air flow through the engine in combination with substantial changes in fan pressure ratio. The variable pitch vanes are arranged in circumferential rows adjacent the inner surface 82, wherein VIGVs 88 are disposed forward of the first row of fan blades 68 and VSVs 90 are disposed aft of the first row of fan blades 68 such that each circumferential row of VSVs 90 is disposed between adjacent rows of fan blades 68, as shown in FIG. 2. Fan assembly 52 preferably comprises two or more fan stages 98, wherein each fan stage 98 generally includes one row each of fan blades 68 and VSVs 90. As shown in FIG. 2 however, the last row of fan blades 68 is not followed by a row of VSVs 90, but rather VOGVs 92 are located axially adjacent to and aft of the last row of fan blades 68.

Figure 3:
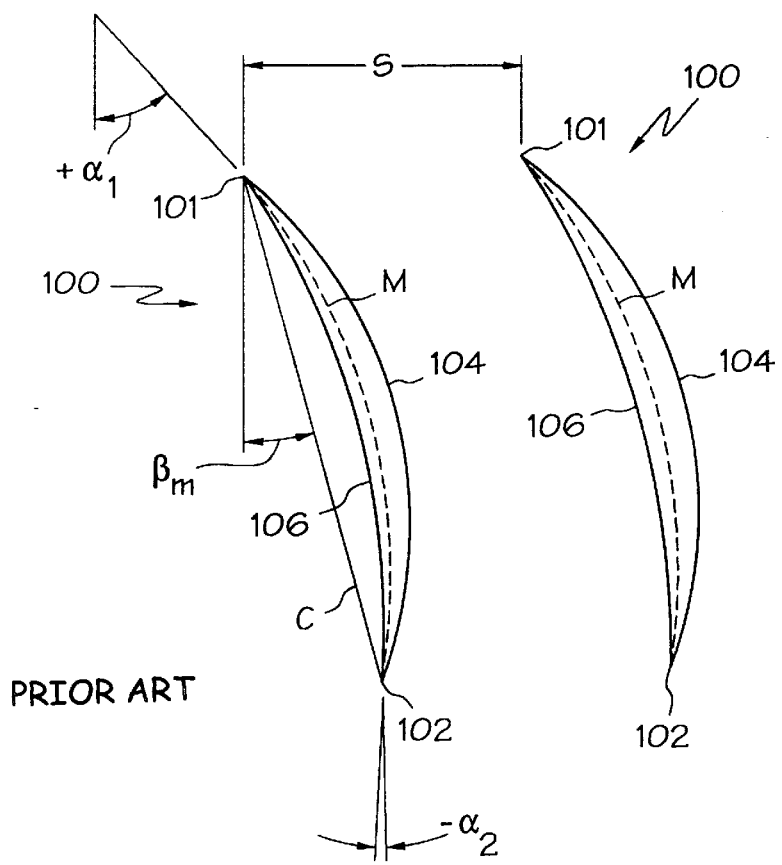
FIG. 3 is a planar view of two vanes illustrating various vane geometric parameters.
Figure 3A:
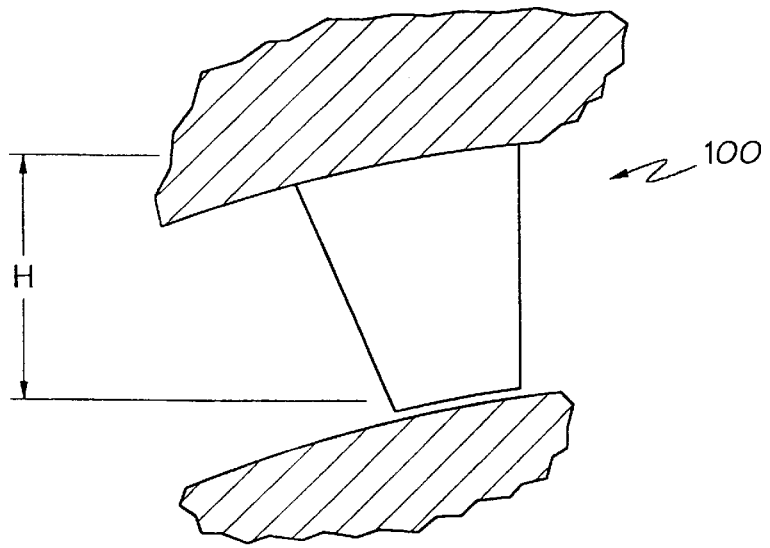
FIG. 3a is a side view of a single vane illustrating the vane geometric parameter of vane height.

Referring now to FIG. 3, various airfoil geometric parameters known in the art are illustrated with respect to a generic vane 100. As shown in FIG. 3, adjacent vanes 100 have a circumferential spacing S which is measured as the circumferential distance between leading edge 101 of adjacent vanes. The average vane height H is generally measured as the average distance from the engine nacelle inner surface to the vane tip, as shown in FIG. 3a, while the vane chord C is the straight line distance between leading edge 101 and trailing edge 102 of a vane, as shown in FIG. 3. Each vane has a vane inlet meanline angle $\alpha_1$ which is the angle between a line tangent with meanline M at the vane leading edge 101 and the engine axial direction. Likewise, the vane exit meanline angle $\alpha_2$ is the angle between a line tangent with meanline M at vane trailing edge 102 and the engine axial direction. As used herein, the term "meanline" refers to the line bisecting a suction or convex surface 104 and a pressure or concave surface 106 between the vane leading edge 101 and the trailing edge 102. For any vane angles discussed herein, a positive angle is an angle which is measured in the counter clockwise direction from the engine axis to the subject angle line when the direction of rotation R of the second shaft 72 about the centerline 60 is clockwise from the aft end of engine 50 looking forward. For example, a positive inlet meanline angle $+\alpha_1$ is an angle in the counter clockwise direction from the engine axis to the tangent line of the vane meanline at the vane leading edge, as shown in FIG. 3. Similarly, a negative angle is an angle which is measured in the clockwise direction from the engine axis to the subject angle line. For instance, a negative exit meanline angle $-\alpha_2$ is an angle in the clockwise direction from the engine axis to the tangent line of the vane meanline at the vane trailing edge, as illustrated in FIG. 3.

A fan assembly of the present invention can be sized on preliminary basis using non-dimensional parameters to describe vane geometry and air flow, the parameters described below being known in the art. These non-dimensional parameters include, but are not limited to, the following:

VANE GEOMETRY PARAMETERS

Vane Solidity $\sigma=C/S$

Vane Aspect Ratio $A=H/C_{avg}$

Vane Camber $\phi=\alpha_1-\alpha_2$

Vane Stagger Angle $\beta_m=(\alpha_1+\alpha_2)/2$
(for vanes having circular arc meanlines)

VANE AIR FLOW PARAMETERS

Air Flow Turning Angle $\upsilon=AI-E$

Air Flow Incidence Angle $i=AI-\alpha_1$

Figure 4:
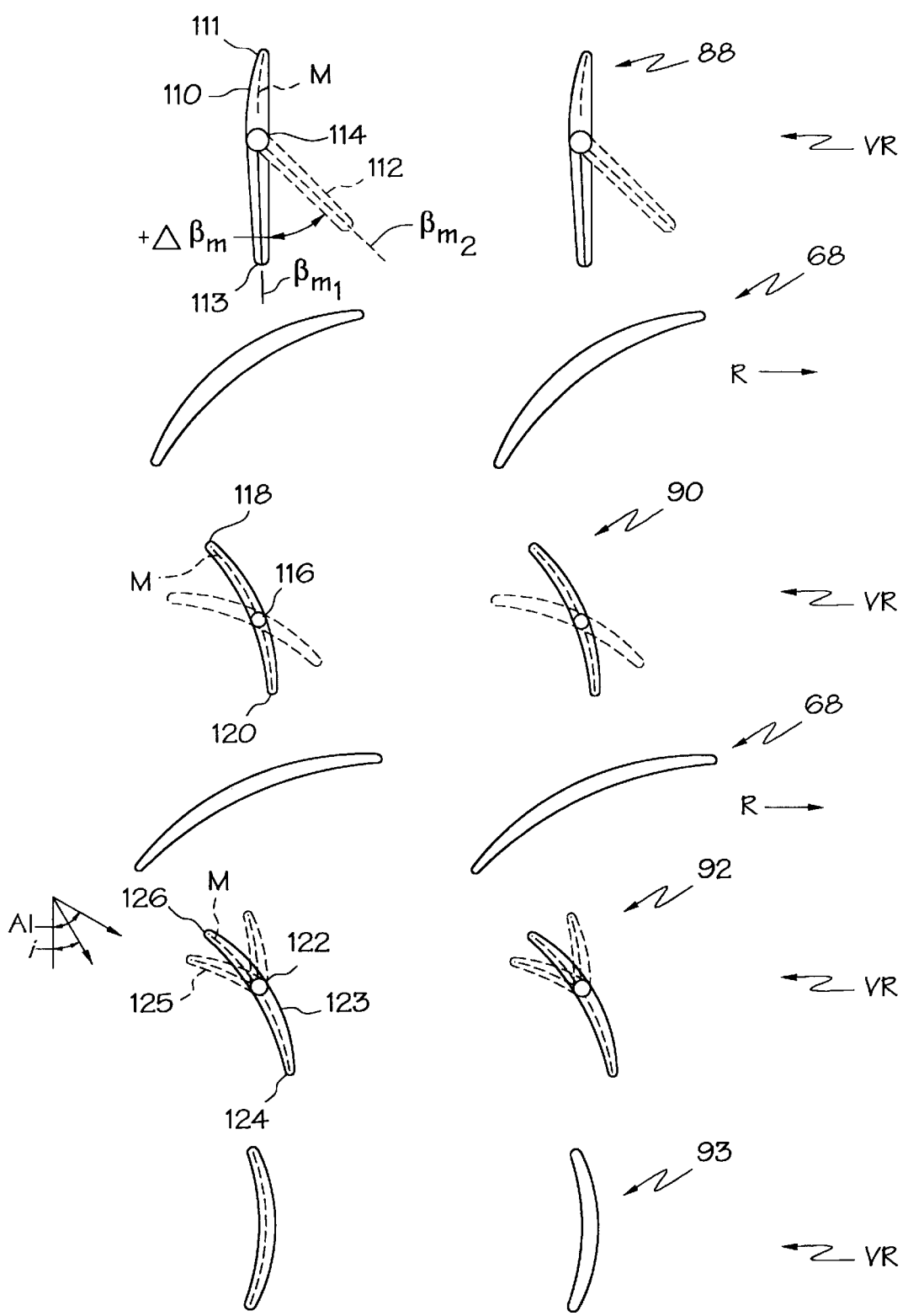
FIG. 4 is a partial planar radial view of the engine of FIG. 2, wherein a portion of the fan case has been removed to illustrate certain structural details.
Figure 4A:
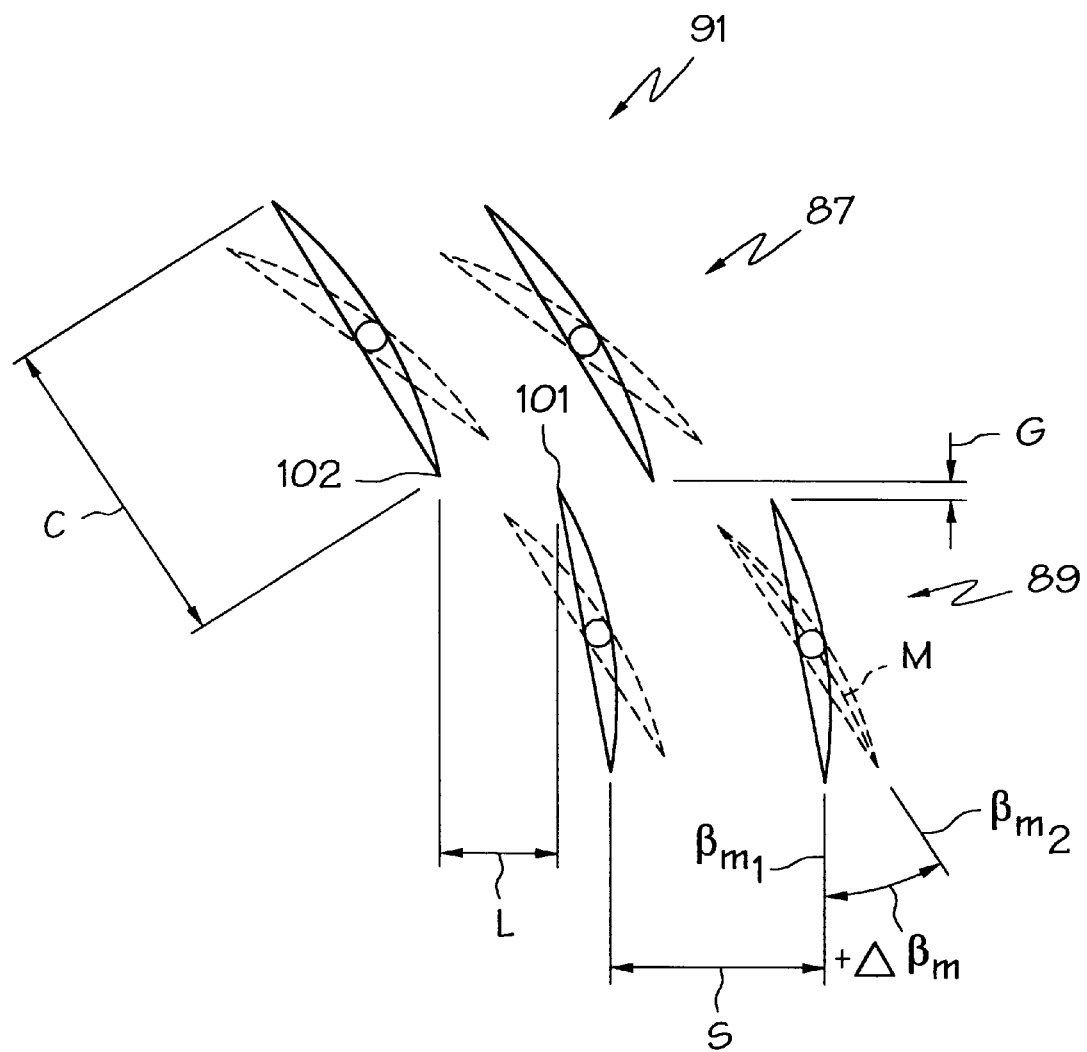
FIG. 4a is a partial planar top view of a tandem VSV arrangement.

Air Flow Deviation Angle $\delta=E-\alpha_2$
Where AI=Air flow inlet angle
E=Air flow exit angle In addition to the above-described parameters, preferably each vane of the present invention is capable of rotation (i.e., is of variable pitch), wherein the angle of rotation $\Delta B_m$ of a vane is the difference between the value of a second vane stagger angle $B_{m2}$ (i.e., after rotation) and the value of the vane stagger angle $B_{m1}$ at a base position (i.e., before rotation), as shown schematically in FIGS. 4 and 4a. For example, a VSV having a stagger angle $B_{m1}$ of +20 degrees at a base point (e.g., a predetermined operating or reference point) and which is rotated to provide a second vane stagger angle $B_{m2}$ of +30 degrees would have an angle of rotation $\Delta B_m$ of +10 degrees from the base point. Similarly, a VSV having a positive stagger angle $\Delta B_{m1}$ of +20 degrees at a base point and which is rotated to provide a second stagger angle $\Delta B_{m2}$ of −30 degrees would have an angle of rotation $\Delta B_m$ of −50 degrees from the base point. For segmented vanes (e.g., vanes wherein a portion rotates and a portion is fixed), each vane segment will have distinct values for each of the above-described vane geometry parameters.

As illustrated in FIG. 4, the VIGVs 88 are preferably segmented having a VIGV forward segment 110 with a VIGV leading edge 111 and a VIGV aft segment 112 with a VIGV trailing edge 113. Preferably, the VIGV forward segment 110 is fixed while the VIGV aft segment is provided with VIGV pivot 114 so that it is capable of rotation as shown by the alternate position illustrated by broken lines in FIG. 4. A VIGV 88 having a VIGV aft segment 113 which can rotate about VIGV pivot 114 provides the ability to change the air flow rate through the engine 50. Accordingly, rotation of VIGV aft segment 113 in a positive direction of rotation (i.e., counter clockwise) incrementally reduces the air flow rate through fan assembly 52. The ratio of the reduced air mass flow rate to the air mass flow rate before vane rotation (i.e, before air flow reduction) is referred to herein as the turn down ratio. For example, the turn down ratio between a first engine operating point having an air mass flow rate of 1000 pps and a second engine operating point having an air mass flow rate of 500 pps after vane rotation is 0.5.

Preferably, the VSVs 90 are provided with a VSV pivot 116 but are not segmented (i.e, comprise a single unitary structure which pivots), wherein both VSV leading edge 118 and VSV trailing edge 120 can simultaneously move in either a positive or negative direction of rotation about VSV pivot 116, as shown in FIG. 4. Rotation of VSVs 90 in a positive direction will further incrementally reduce the air flow through fan assembly 52, thereby complementing the air flow reducing action of VIGVs 88. Thus, it is believed that large turn down ratios in the air mass flow rate through fan assembly 52 can be achieved by simultaneously rotating VIGVs 88 and VSVs 90 in a positive direction.

While it is preferred that each fan stage 98 comprise a single row of VSVs 90, it is contemplated that a tandem VSV arrangement 91 having a first tandem VSV row 87 and a second tandem VSV row 89 in axial serial relationship can be provided in a single fan stage, as illustrated in FIG. 4a. The VSVs of each tandem row have a circumferential spacing S and chord length C as previously discussed. In addition, the leading edge 101 of each vane in the second tandem VSV row 89 is offset both a circumferential offset distance L and an axial gap distance G from the trailing edge 102 of its serial vane in the first tandem VSV row 87, as shown in FIG. 4a. More preferably, the tandem VSV arrangement 91 can be provided after the last row of fan blades 68 but before the VOGVs 92 when a large air flow turn down ratio is desired but a single row of VSVs would be unable to turn the flow without stalling. Preferably, both first and second tandem rows of VSVs 87 and 89 would have the same chord C and solidity $\sigma$. More preferably, the vane camber $\phi$ of the first tandem VSV row 87 would provide about one fourth of the total air flow turning (i.e., the difference between the air flow inlet angle AI to the first tandem VSV row 87 and the air flow exit angle E from the second tandem VSV row 89) and both the vane rows 87 and 89 would be articulated to provide the same angle of rotation $\Delta B_m$. Air flow performance across tandem VSVs 91 could be measured as a function of the vane spacing ratio and the vane gap ratio, wherein the vane spacing ratio is the ratio of the vane offset distance L over the space S while the gap ratio is the ratio of vane gap G over the chord C.

The VOGVs 92 are preferably segmented having a VOGV forward segment 125 with a VOGV leading edge 126 and a VOGV aft segment 123 with a VOGV trailing edge 124. Preferably, the VOGV aft segment 123 is fixed while the VOGV forward segment 125 is provided with VOGV pivot 122 so that it is capable of rotation as shown by the alternate position illustrated by broken lines in FIG. 4. Preferably, the VOGV forward segment is provided with a positive angle of rotation $\Delta B_m$ for matching the vane leading edge meanline angle $\alpha_1$ to the air flow inlet angle AI (i.e., the vane leading edge meanline angle $\alpha_1$ is about equal to the air flow inlet angle AI so as to minimize aerodynamic losses across VOGVs 92). In addition to matching the vane meanline angle $\alpha_1$ at the leading edge to the incoming airflow, VOGVs 92 also preferably turn the air flow passing there over so that the air exits at a loading level which is acceptable. A fixed OGV 93 can also be provided axially adjacent to and aft of variable pitch VOGVs 92 to ensure that turning of the air flow to the engine axial direction is accomplished.

Although it is preferred that fan assembly 52 comprise VIGVs 88, VSVs 90 and VOGVs 92, it is recognized that other configurations may be provided in accordance with the present invention. For example, fan blades 68 can be provided with a pivot structure so that the fan blades are also capable of rotation in a manner similar to VIGVs 88, VSVs 90, and VOGVs 92. Alternatively, fan assembly 52 could comprise VIGVs 88, VSVs 90 and a fixed outlet guide vane in place of VOGVs 92. Further, additional rows of fan blades 68, VIGVs 88, VSVs 90, and VOGVs 92 can be provided beyond those illustrated herein. Although it is preferred that VIGVs 88 and VOGVs 92 are segmented and provided with mid-vane pivots as generally shown in FIG. 4, other structures can also be provided. For example, VIGVs 88 and VOGVs 92 can be unitary structures wherein the VIGV pivot 114 is located at the VIGV leading edge 111 while VOGV pivot 122 is provided at the VOGV trailing edge 124.

Each variable pitch vane in a circumferential row VR is mechanically linked to the other vanes in the same row VR such that each vane therein will have the same angle of rotation $\Delta B_m$ from a base position at any given time. Further, the angle of rotation $\Delta B_m$ for each circumferential vane row VR is preferably related linearly to the angle of rotation $\Delta B_m$ in each other circumferential vane row such that an angle of rotation $\Delta B_m$ of VIGVs 88 results in a linear angle of rotation $\Delta B_m$ of each vane row VR. For example, a fan assembly having one row of VIGVs, three rows of VSVs and one row of VOGVs could have a linear vane step schedule wherein a 1.5 degree rotation $\Delta B_m$ of VIGVs 88 results in a 1.0, 0.8, and 0.6 degree rotations $\Delta B_m$ of first, second, and third rows of VSVs 90 respectively and a 0.8 degree rotation $\Delta B_m$ of VOGVs 92. Although it is preferred that the vane step schedule is linear, non-linear vane step schedules can also be provided. The mechanical actuation of the variable pitch vanes can be accomplished by mechanics, hydraulics, pneumatics or the like, as is known in the art.

Figure 5:
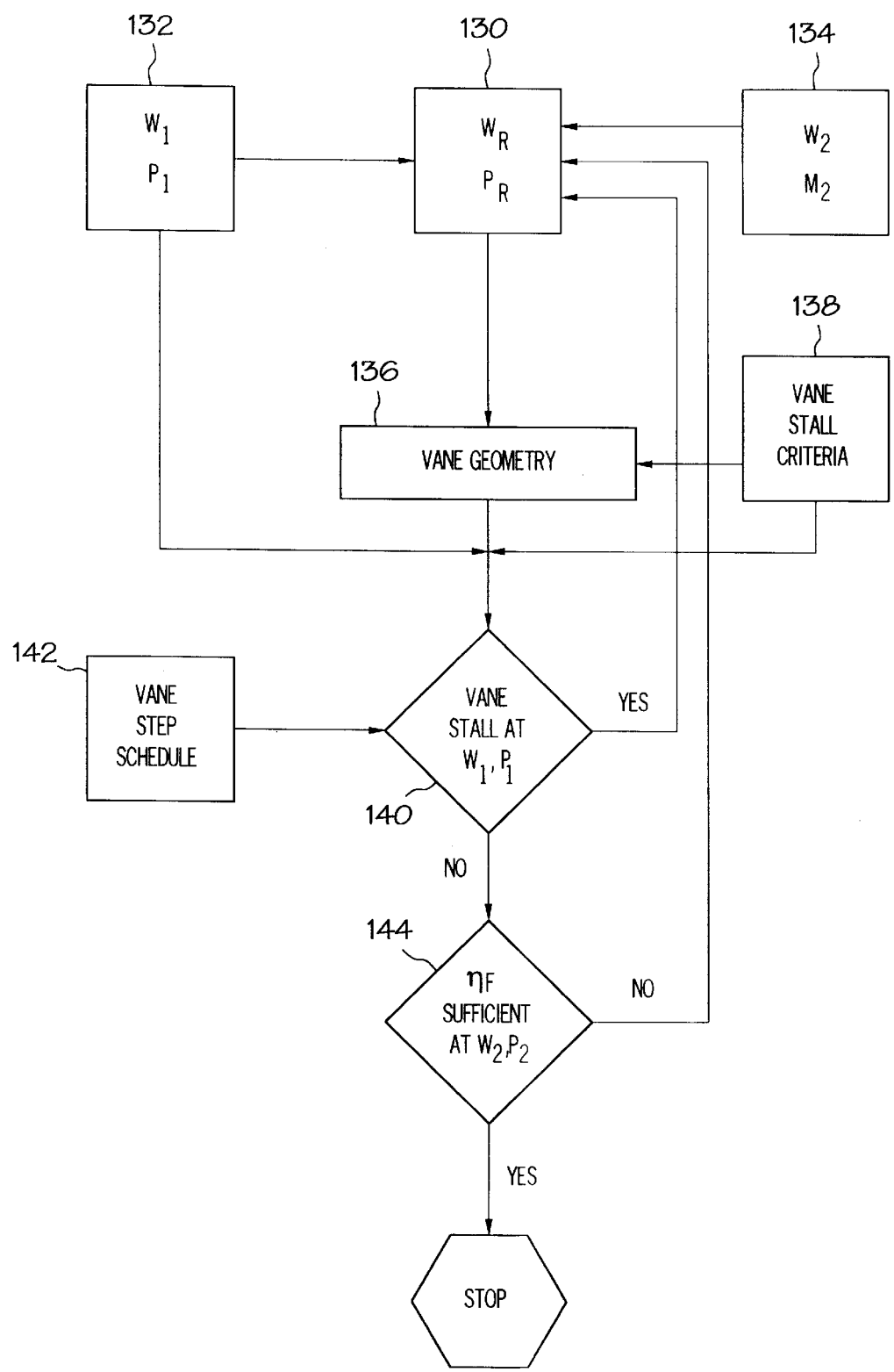
FIG. 5 is graphical representation of a preferred method of designing the engine of FIG. 2.

FIG. 5 illustrates a preferred method of determining the vane geometry (e.g., number of fan stages, the length of vane chord C, the vane solidity $\sigma$, the vane aspect ratio A, vane stagger, vane meanline angles, etc.) and vane schedules for a fan assembly 52 made in accordance with the present invention. As used herein, the phrase "vane schedule" is intended to mean the angle of rotation $\Delta B_m$ of a vane (e.g., VIGVs 88, VSVs 90, and VOGVs 92) as measured from a base point as discussed previously. As will be understood, this preferred method is particularly useful in designing an engine 50 having a fan assembly 52 which can provide a maximum corrected fan air flow and a low fan pressure ratio for aircraft take-off conditions and a low corrected fan air flow and maximum fan pressure ratio for aircraft climb and acceleration, as discussed more fully hereafter.

As shown in FIG. 5, a reference point having a reference corrected fan air flow $W_r$ and reference fan pressure ratio $P_r$ is selected in block 130 based upon a first corrected fan air flow $W_1$ and first fan pressure ratio $P_1$ of a first predetermined operating point of block 132 and a second corrected fan air flow $W_2$ and fan exit Mach number $M_2$ of a second predetermined operating point of block 134, wherein typically the first corrected air flow $W_1$ is less than the second corrected air flow $W_2$ and the first fan pressure ratio $P_1$ is greater than the second fan pressure ratio $P_2$ the second operating point. Preferably, reference fan corrected air flow $W_r$ is about equal to the second corrected fan air flow $W_2$ and the reference fan pressure ratio $P_r$ is greater than the first fan pressure ratio $P_1$, although it is contemplated that the reference fan pressure ratio $P_r$ and reference fan corrected air flow $W_r$ can have other values (e.g., the fan reference pressure ratio $P_r$ is less than the first fan pressure ratio $P_1$ but greater than second fan pressure ratio $P_2$). An initial determination of the vane geometry (e.g., solidity, aspect ratio, number of fan stages, etc.) is performed in block 136 based upon satisfaction of the predetermined vane stall criteria (e.g., vane loading D factor, etc., as is known in the art) of block 138 at the reference fan air flow corrected $W_r$ and reference fan pressure ratio $P_r$.

In block 140, the predetermined vane stall criteria of block 138 are evaluated with respect to the first fan operating point (e.g., the operating point defined by block 134) based upon the vane geometry of block 136 and an angle of rotation $\Delta B_m$ of the variable fan geometry based upon the predetermined vane step schedule of block 142. If the vane stall criteria of block 138 are not also satisfied for the first fan corrected air flow $W_1$ and the first fan pressure ratio $P_1$, a new reference point having a different reference fan corrected air flow $W_r$ and reference fan pressure ratio $P_r$ is selected and the above-described process is repeated until a satisfactory vane geometry is achieved.

At block 144, the fan efficiency $\eta_f$ is evaluated at the second operating point. If the efficiency $\eta_f$ at the second operating point is not satisfactory, the iterative process returns to block 130 where a new reference point is selected. If the fan efficiency $\eta_f$ is satisfactory, the iterative method of designing a fan assembly in accordance with the present invention is complete. Although the above-described iterative method of designing a fan in accordance with the present invention is preferred, it will be understood that different steps, additional steps, order of steps, input parameters, or output parameters can be used for designing a fan assembly based upon the selection of a reference point and at least two predetermined operating points. For example, the vane step schedule of block 142 can be varied in conjunction with iteratively selecting the fan reference point of block 130.

Analytical studies (i.e., one dimensional pitchline studies) show that a preferred fan assembly 52 designed in accordance with the above-described method can provide large swings in both fan pressure ratio and corrected air flow at a constant corrected fan speed between a first predetermined fan operating point and a second predetermined fan operating point. Particularly, an air flow turn down ratio of less than about 0.7 and, more preferably, a turn down ratio of less than about 0.5 can be provided in combination with a fan pressure ratio increase of at least about 50 percent and, more preferably, of at least about 100 percent, respectively, with a fan assembly having three fan stages. These studies also show that increasing the number of fan stages 98 can provide still lower turn down ratios in combination with further increases in the fan pressure ratio between first and second fan operating points. In addition, a reduction in the acceptable vane stall criteria of block 138 or the fan efficiency of $\eta_f$ of block 144 can provide still lower turn down ratios and increases in fan pressure ratio between first and second fan operating points.

Figure 6:
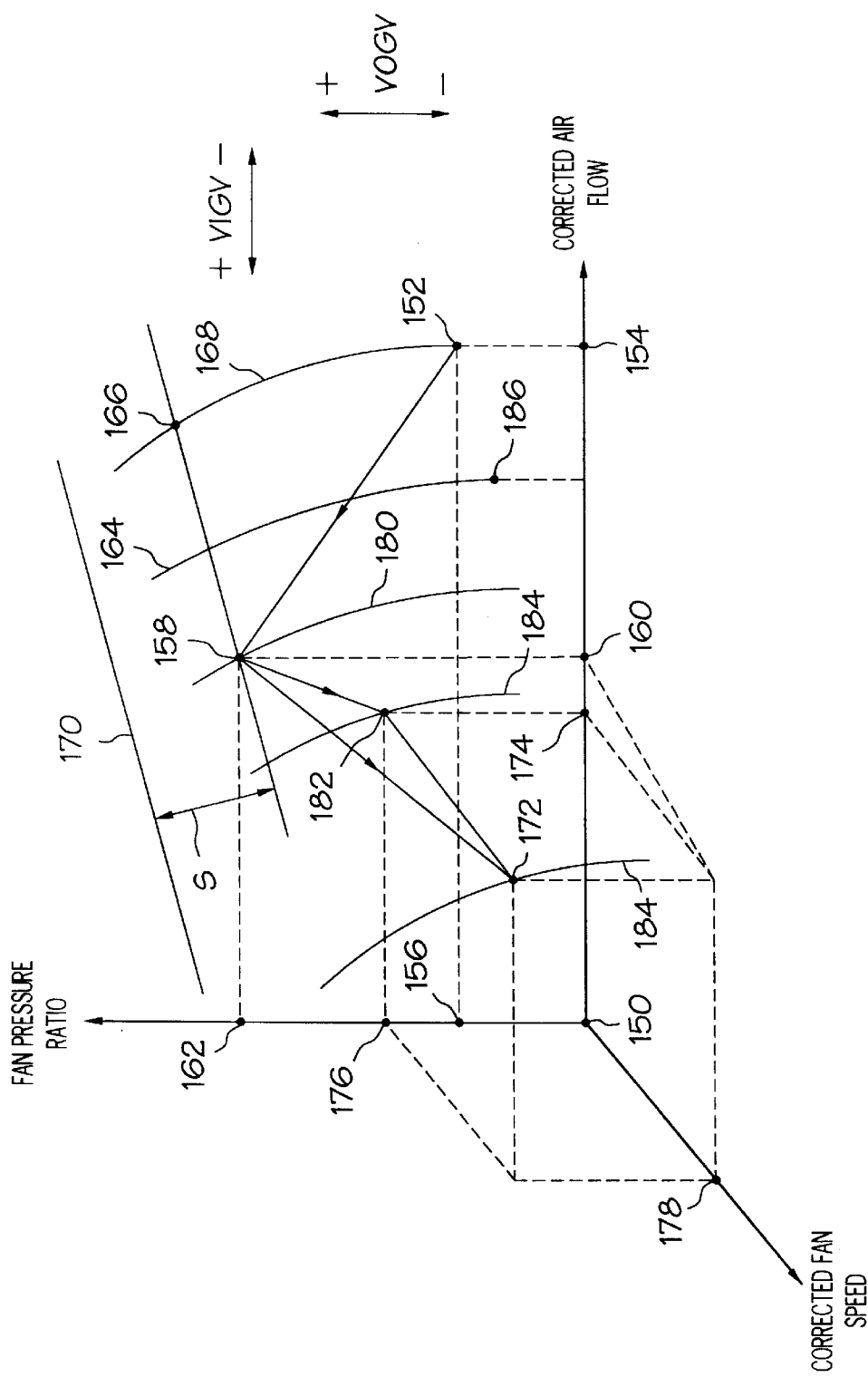
FIG. 6 is graphical plot of a preferred method of operating the gas turbine engine of FIG. 2.

Referring now to FIG. 6, an exemplary method of operating an engine 50 having a fan assembly 52 made in accordance with the present invention is illustrated. In particular, FIG. 6 is a plot of a preferred operating characteristic of a fan assembly 52 of engine 50, wherein the X-axis is corrected air flow (pps/sec), the Y-axis is fan pressure ratio, and the Z axis is corrected fan speed. Thus, all points in the X–Y plane of FIG. 6 are at a constant fan corrected speed 150 (i.e., at a fixed point on the Z axis). A first operating point 152 has a first corrected fan air flow 154 and first fan pressure ratio 156. The first predetermined operating point 152 represents a high corrected fan air flow and low fan pressure ratio operating point, such as would be advantageous for an aircraft take-off condition. The first corrected fan air flow 154 would provide adequate thrust for aircraft take-off while the first fan pressure ratio 156 reduces exhaust gas velocity Vj and therefore reduces engine noise. In contrast, a second predetermined operating point 158 has a relatively lower second corrected fan air flow 160 and a higher second fan pressure ratio 162 than the first operating point 152. As seen in FIG. 6, both operating points 152 and 158 are at the same corrected fan speed 150. Thus, movement from the first operating point 152 to the second operating point 158 is achieved without a change in corrected fan speed. The second operating point 158 represents a low corrected fan air flow and high fan pressure ratio operating point, such as would be advantageous for aircraft climb and acceleration. The second fan pressure ratio 162 provides a high exhaust gas velocity Vj and therefore high specific thrust $F_{sp}$ for rapid aircraft acceleration and the second corrected fan air flow 160 provides high propulsive efficiencies $\eta_p$.

Vane schedule lines 164 preferably represent lines of constant VIGV angle of rotation $\Delta B_m$ relative to a VIGV vane schedule reference line 168, wherein VIGV vane schedule reference line 168 passes through the reference point 166 and the first operating point 152 (i.e., the reference and first operating points are the base point for measuring the VIGV angle of rotation $\Delta B_m$ and both the reference point 166 and the first operating point 152 therefore have a 0° VIGV angle of rotation $\Delta B_m$). Movement along a VIGV vane schedule line in the direction of increasing fan pressure ratio is accomplished by rotating the VOGVs to provide a positive VOGV angle of rotation $\Delta B_m$ while movement between VIGV vane schedule lines in the direction of decreasing fan corrected air flow is accomplished by rotating the VIGVs to provide a positive VIGV angle of rotation $\Delta B_m$. For example, vane schedule line 164 could have a positive VIGV angle of rotation $\Delta B_m$ of 15 degrees while VIGV vane schedule line 180 could have a positive VIGV angle of rotation $\Delta B_m$ of 48 degrees. Depending on predetermined vane step schedule and the requirements of operating point 152, the VSV's 90 and VOGV's 92 may also have positive angles of rotation $\Delta B_m$ at vane schedule lines 164 and 180 relative to operating point 152, as discussed in more detail hereafter.

Movement from reference point 166 to operating point 152 is achieved by opening the VOGVs (i.e., rotating the VOGV forward segment 124 in a clockwise direction such that a negative angle of rotation $\Delta B_m$ is provided) while maintaining a 0° angle of rotation $\Delta B_m$ for the VIGVs and VSVs until operating point 152 is achieved. Transition from operating point 152 to operating point 158 is achieved by incrementally rotating the VIGVs 88, VSVs 90 and VOGVs 92 in a positive direction of rotation according to a predetermined vane step schedule. For example, if vane reference line 180 represents a VIGV aft segment angle of rotation $\Delta B_m$ of 48 degrees and if the previously discussed vane step schedule is adopted, the VSV and VOGV angles of rotation $\Delta B_m$ at vane schedule line 180, as measured from the angles of rotation $\Delta B_m$ at fan operating point 152, would be: VSV1=32°, VSV2=25.6°, VSV3=19.2°, and VOGV forward segment=25.6°. As shown in FIG. 6, the fan assembly is capable of operating between operating points 152 and 158 while still providing adequate fan stall margin S between operating point 158 and fan stall line 170.

Operating point 172 has a third corrected fan air flow 174 and a third fan pressure ratio 176 at corrected fan speed 178, wherein corrected fan speed 178 is less than corrected fan speed 150. Transition from operating point 158 to operating point 172 is achieved by decreasing corrected fan speed while maintaining constant the angles of rotation $\Delta B_m$ of the VIGVs, VSVs and VOGVs between operating points 158 and 172. Alternatively, operating point 182 having the same third corrected fan air flow 174 and third fan pressure ratio 176 as operating point 172 (and hence the same specific thrust $F_{sp}$) can be achieved by rotating the VIGVs to vane schedule 184 having a different angle of rotation $\Delta B_m$ (and hence also rotating the VSVs and VOGVs although a different predetermined vane step schedule from that used between operating points 152 and 158 may be provided), thereby moving from operating point 158 to operating point 182.

Although the above-described method of engine operation is preferred, it will be understood that additional operating points can be provided. For instance, a subsonic cruise point 186 can be provided by operating at VIGV vane schedule line 164 and further providing a negative VOGV angle of rotation $\Delta B_m$ from that of first operating point 152. Thus, a matrix of operating points are possible based upon the scheduling of the VIGVs, VSVs and VOGVs. For additional clarity, example 1 below illustrates an analytical structure and method of engine operation according to the present invention for a fan assembly having three fan stages.

EXAMPLE 1

For illustration only, a preferred fan assembly can be provided which can operate at first predetermined operating point having a corrected air flow $W_1$ of about 825 pps and a fan pressure ratio of about 2.9 and at a second predetermined operating point having a corrected air flow $W_2$ of about 650 pps (i.e., a turn down ratio of about 0.8) and a fan pressure ratio of about 3.7. Based upon these operating requirements, a reference point having a corrected air flow $W_r$ of about 815 pps and a pressure ratio $P_r$ of about 4.4 is selected. Following the above-described iterative procedure, the air flow inlet angles AI and air flow exit angles E (both in degrees) for the reference point and first and second predetermined operating points are set forth below in Table 1. These air flow inlet angles AI and exit angles E represent a first order analysis, wherein it is presumed that an angle of rotation $\Delta B_m$ of 1.5 degrees of a VIGV or VSV will change the air flow exit angle E by 1 degree. Further, for discussion purposes the first operating point is the base point for determining the angle of rotation $\Delta B_m$ of the VIGV, VSVs, and VOGVs.

TABLE 1

| Fan Point | VIGV | | VSV 1 | | VSV 2 | | VOGV | |
|---|---|---|---|---|---|---|---|---|
| | AI | E | AI | E | AI | E | AI | E |
| Reference Point | 0 | 10 | 49 | 17 | 51 | 10 | 51 | 0 |
| First Operating Point | 0 | 10 | 47 | 17 | 47 | 10 | 26 | 0 |
| Second Operating Point | 0 | 30 | 56.1 | 30.4 | 56.2 | 20.7 | 55.2 | 0 |

With respect to the vane geometry, the VIGV has a VIGV forward segment with a camber $\phi$ and stagger $\beta_m$ equal to 0. The VIGV aft segment has a camber $\phi$ equal to 0 but a stagger $\beta_m$ at the reference point and first operating point of about +10 degrees. The stagger $\beta_m$ at the second fan operating point is about +30 degrees (i.e., a +20 degree angle of rotation $\Delta B_m$ from the +10 degree fan reference point which is the base point). The VIGV aft segment has an aspect ratio A and solidity $\sigma$ of between about 0.7 to about 1.5.

With respect to VSV1, the air flow incidence angle i to the first row of stators VSV1 is 0 (i.e., the vane inlet meanline angle $\alpha_1$ is about 49 degrees) with an air flow deviation angle $\delta$ of about 0 degrees and a resultant camber $\phi$ of about 32 degrees at the reference point and the first operating point. Therefore, the VSV1 stagger angle $\beta_m$ is about +33 degrees with an air flow exit angle E of about 17 degrees. The VSV1 aspect ratio A is between about 0.5 and about 1.5 and the solidity $\sigma$ is between about 1.2 to about 2. At the second operating point, the VSV1 has a stagger angle $\beta_m$ of 46 degrees (i.e., an angle of rotation $\Delta B_m$ of about +13 degrees from the +13 degrees at the base point) and an air flow exit angle E of about 30 degrees. The vane inlet meanline angle $\alpha_1$ is about 62 degrees (i.e., the vane inlet meanline angle $\alpha_1$ of about 49 degrees at the base point plus the 13 degree rotation at the second fan operating point). Consequently, the air flow incidence angle i is about −6 degrees. At the reference point and the first operating point, the VSV2 have an inlet air flow angle AI of about 51 degrees and an air flow exit angle E of about 10 degrees. With an air flow incidence angle i of about 0, the air flow deviation angle $\delta$ is about 0 degrees and the resultant camber $\phi$ is about 41 degrees. The VSV2 vane stagger angle $\beta_m$ is about 30 degrees with an exit meanline angle $\alpha_2$ of about 10 degrees. The VSV2 aspect ratio A is between about 0.5 and about 1.5 while the VSV2 solidity $\rho$ is between about 1.5 and about 2.5. At the second operating point, the VSV2 has a vane stagger angle $\beta_m$ of about 41 degrees and an angle of rotation $\Delta B_m$ from the base point of about 10 degrees such that the air flow exit angle E is about 20 degrees. The air flow inlet angle AI is about 56 degrees and the inlet meanline angle $\alpha_1$ is about 61 degrees.

With respect to the VOGV, the air flow inlet angle AI moves from about 51 degrees at the reference point to about 26 degrees at the first operating point to about 55 degrees at the second operating point. The VOGV preferably provides an exit air flow angle E of about 0 so that excessive energy loss and low propulsive efficiencies $\eta_p$ can be avoided. For the above-described operating conditions a tandem VOGV (i.e., two VOGV rows in serial axial flow relationship) will be required wherein the first VOGV row comprise segmented vanes having a fixed VOGV aft segment and VOGV forward segment which is capable of rotation. The stagger angle $\beta_m$ of the VOGV forward segment is adjusted to provide an air flow incidence angle i of about 0 and minimize surface discontinuities across the vane. The VOGV aft segment is fixed and provides an air flow exit angle E of about 0 degrees. The overall solidity $\sigma$ and aspect ratio A for the first VOGV row is between about 1.0 and about 2.0 and between about 0.5 and about 1.2, respectively, wherein the overall values are with respect to the vane from its leading edge to its trailing edge generally rather than across a vane segment.

The second VOGV row is fixed and configured to accept the air flow exit angle $\alpha$ from the first VOGV row. The solidity $\sigma$ and aspect ratio A of the second VOGV is between about 1.5 to about 2.0 and between about 0.6 and about 1.0, respectively.

Having shown and described the preferred embodiments of the present invention, further adaptation of the improved engine structure and method for operating the same can be accomplished by appropriate modifications by one of ordinary skill in the art without departing from the scope of the present invention. A number of alternatives and modifications have been described herein and others will be apparent to those skilled in the art. For example, broad ranges for physically measurable parameters have been disclosed for the inventive engine structure as preferred embodiments of the present invention, yet it is contemplated that the physical parameters of the engine structure can be varied to produce other preferred embodiments of improved engine structure of the present invention as desired. Engine 50 can be provided with two exhaust nozzles such that bypass duct 86 has a separate exhaust nozzle for discharging the air flow passing therethrough to the ambient environment. Accordingly, the scope of the present invention should be considered in terms of the following claims and is understood not to be limited to the details of the structures and methods shown and described in the specification and drawings.

What is claimed is:

1. A method for designing a variable cycle gas turbine engine, said variable cycle gas turbine engine having a fan assembly with a maximum air flow there through and a maximum pressure ratio there across during operation at a fan speed, said fan assembly having a plurality of variable pitch vanes, comprising the steps of:

(a) selecting a first operating point of the variable cycle gas turbine engine at a fan speed having about said maximum air flow through said fan assembly at a pressure ratio substantially less than said maximum pressure ratio;

(b) selecting a second operating point of the variable cycle gas turbine engine at about said fan speed, said second operating point having about said maximum pressure ratio across said fan assembly at an air flow through said fan assembly substantially less than said maximum air flow;

(c) selecting a reference point having a reference air flow through said fan assembly and a reference pressure ratio across said fan assembly;

(d) determining a geometry of said variable pitch vanes such that said variable pitch vanes can operate at said reference point without stalling;

(e) determining whether said variable pitch vanes stall at said second operating point and repeating steps (c) and (d) until said variable pitch vanes do not stall at said second operating point;

(f) determining an efficiency of said fan assembly at said first operating point and repeating steps (c) to (e) until said efficiency is at least about equal to a predetermined efficiency; and (g) employing the variable pitch vane geometry from step (d) for design of said variable cycle gas turbine engine.

2. The method of claim 1, wherein said reference air flow is between about said maximum air flow of said first operating point and about said air flow of said second operating point.

3. The method of claim 2, wherein said reference pressure ratio is between about said maximum pressure ratio and about said pressure ratio of said second operating point.

4. The method of claim 1, wherein said variable pitch vanes are arranged in at least one row and wherein said step of determining said geometry includes the step of determining the number of said rows of said variable pitch vanes.

5. The method of claim 1, wherein said variable pitch vanes have a reference pitch position at said reference point and wherein said step of determining said efficiency at said first operating point is performed with said variable pitch vanes at said reference position.

6. The method of claim 5, wherein said step of determining whether said variable pitch vanes stall at said second operating point further comprises the step of rotating said variable pitch vanes.

7. The method of claim 6, wherein said rotation of said variable pitch vanes is to an open position with respect to said reference pitch position.

8. The method of claim 1, wherein the ratio of said air flow at said second operating point to said maximum air flow is less than about 0.5.

9. The method of claim 1, wherein the ratio of said air flow at said second operating point to said maximum air flow is between about 0.5 and about 0.7.

10. The method of claim 1, wherein said pressure ratio at said second operating point is between about 50 percent and about 100 percent greater than said pressure ratio at said first operating point.

11. A method for designing a variable cycle gas turbine engine, said variable cycle gas turbine engine having a fan assembly with a maximum air flow there through and a maximum pressure ratio there across during operation at a fan speed, said fan assembly having a plurality of variable pitch vanes, comprising the steps of:

(a) selecting a first operating point of the variable cycle gas turbine engine at a fan speed having about said maximum air flow through said fan assembly at a pressure ratio substantially less than said maximum pressure ratio;

(b) selecting a second operating point of the variable cycle gas turbine engine at about said fan speed, said second operating point having about said maximum pressure ratio across said fan assembly at an air flow through said fan assembly substantially less than said maximum air flow;

(c) selecting a reference point having a reference air flow through said fan assembly and a reference pressure ratio across said fan assembly, wherein said reference air flow is between about said maximum air flow and about said air flow of said second operating point and wherein said reference pressure ratio is between about said maximum pressure ratio and about said pressure ratio of said second operating point;

(d) determining a geometry of said variable pitch vanes such that said variable pitch vanes can operate at said reference point without stalling;

(e) determining whether said variable pitch vanes stall at said second operating point and repeating steps (c) and (d) until said variable pitch vanes do not stall at said second operating point;

(f) determining an efficiency of said fan assembly at said first operating point and repeating steps (c) to (e) until said efficiency is at least about equal to a predetermined efficiency; and (g) employing the variable pitch vane geometry from step (d) for design of said variable cycle gas turbine engine.

12. The method of claim 11, wherein said variable pitch vanes have a reference pitch position at said reference point and wherein said step of determining said efficiency at said first operating point is performed with said variable pitch vanes at said reference position.

13. The method of claim 12, wherein said step of determining whether said variable pitch vanes stall at said second operating point further comprises the step of rotating said variable pitch vanes.

14. The method of claim 11, wherein said fan assembly is provided with an inlet and an exit and wherein said plurality of variable pitch vanes comprise a plurality of variable pitch inlet guide vanes disposed adjacent said inlet and a plurality of variable pitch outlet guide vanes disposed adjacent said outlet.

15. The method of claim 14, wherein said fan assembly is provided with a plurality of fan blades for imparting kinetic energy to air passing through said fan assembly during use, said plurality of fan blades being arranged in at least a first row and a second row, said first row being disposed adjacent to and downstream of said variable pitch inlet guide vanes and said second row being disposed adjacent to and upstream of said variable pitch outlet guide vanes and wherein said plurality of variable pitch vanes further comprise a plurality of variable pitch stator vanes disposed between said first and second rows of fan blades.

16. The method of claim 11, wherein said step of determining said vane geometry further comprises the step of determining the aspect ratio of said variable pitch vanes.

17. The method of claim 11, wherein said step of determining said vane geometry further comprises the step of determining the solidity of said variable pitch vanes.

18. The method of claim 15, wherein said variable pitch stator vanes are arranged in at least one row and wherein said step of determining said geometry includes the step of determining the number of said rows of said variable pitch stator vanes.

* * * * *